April 19, 1960     J. L. HILLMAN ET AL     2,933,102
ENVIRONMENT EXCLUDING VENT PLUG
Filed Sept. 19, 1957

INVENTORS.
JOHN F. HORNING
JERRY L. HILLMAN
BY
Thomas S. MacDonald
ATTORNEY

United States Patent Office 2,933,102
Patented Apr. 19, 1960

2,933,102
ENVIRONMENT EXCLUDING VENT PLUG

Jerry L. Hillman and John F. Horning, Northridge, Calif., assignors to North American Aviation, Inc.

Application September 19, 1957, Serial No. 684,961

8 Claims. (Cl. 137—525.3)

This invention relates to a vent plug and is particularly concerned with an integral plug which will allow venting of a chamber while excluding environment therefrom.

In numerous instances, particularly in the hydraulic and pneumatic fields, the problem of venting certain areas within valves, lines, etc., exists. Various means have been utilized to overcome this problem, the simplest of such means being a hole drilled through the chamber wall to communicate with the chamber to be vented. A direct vent is thus facilitated. Perhaps a more usual method, since it is generally desirable to exclude contaminants from the vented chamber and the direct vent is unable to give this protection, is to provide a mechanical type plug which includes or is associated with aperture means and is installed through the chamber wall. The aperture means provides venting and the plug usually covers the aperture to prevent contaminant ingress. While various plugs have been designed in attempts to overcome the general problem, neither the resultant plugs nor the direct vent have provided a really satisfactory solution. The apparatus designed to fill this need has generally been bulky, mechanically complex, or has required a complex aperture arrangement through the chamber wall and/or associated with the plug.

The plug, or cover, of the present invention is extremely simple of construction and requires only the most basic of aperture means associated with the chamber to be vented. Yet it will vent effectively and efficiently exclude environment in the form of pressure or foreign materials from entering the vented chamber. The plug may be further utilized as a check valve in a unidirectional fluid channel.

It is an object of this invention to provide a cover or plug which, when installed through the wall of a chamber to be vented, will allow venting but prevent ingress of air, water or the like through the vent.

Another object is to provide a vent plug with a resilient lip member and a contaminant trap.

A further object of this invention is to provide an integral plug simple of construction and easy of installation to a chamber to be vented.

Yet another object is to provide a valve and seat assembly to allow fluid flow in one direction and prevent flow in the opposite direction.

Still another object is to provide a resilient plug with an annular trap and a tortuous passage to allow fluid flow in one direction but prevent back-flow.

Other objects of invention will become apparent from the following description taken in connection with the accompanying drawings, in which.

Figure 1:
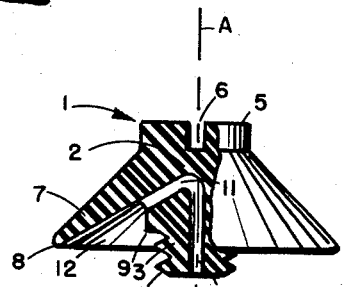
Fig. 1 is a partially sectioned elevational view of the invention.

The plug of this invention, illustrated in the drawings in its preferred embodiment, is generally designated as 1 in each of the views. As seen in Fig. 1 the portion of plug 1 located centrally about axis A is designated as body 2. A shank 3 axially extending from body 2, as a part thereof, is provided with threads 4 about its periphery. A head 5, located on body 2 oppositely of shank 3, is normally provided with a slot 6 for the acceptance of a screwdriver for tightening the plug into its seat. A standard knurled top, or other comparable tightening or tool receiving means may be substituted for slot 6. Extending outwardly and substantially conically from body 2 is a flexible lip member or skirt 7 having its tip or free end 8 directed divergently at an acute angle from shank 3 but in the same general direction away from head 5. Skirt 7 is preferably of tapered cross section with the thinnest portion being at, or near, tip 8. This provides a greater degree of resiliency near the tip than at the skirt root or attachment point to body 2 and enhances flexing capability. A shoulder 9 may be provided upon body 2 between shank 3 and skirt 7; its purpose to be explained hereinafter. Tip 8 of skirt 7 must extend axially beyond shoulder 9.

Body 2 is provided with a labyrinth or tortuous passage which may be drilled or formed therein as shown in Fig. 1, or in other similar and comparable manners. A first passage 10 extends axially through a portion only of body 2 exiting at the end of shank 3. Passage 10 is joined at its end nearest to head 5 by a second passage 11 which is slanted from an annular groove 12 defined between skirt 7 and shoulder 9. Passages 10 and 11 together form a reentrant passage. If desired, multiple tortuous passageways communicating between the groove 12 and the end of shank 3 may be employed.

Figure 2:
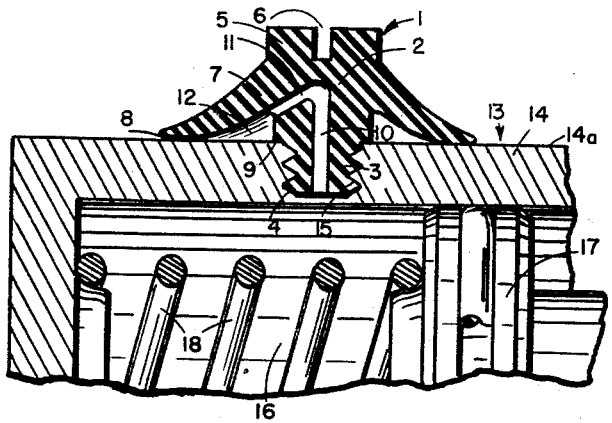
Fig. 2 is a sectioned elevational view of the plug of this invention as normally installed to vent a valve body.

The plug of Fig. 1 may be installed to vent or check fluid flow in a variety of circumstances and conditions. Fig. 2 illustrates a representative application, wherein it is installed through the wall of a typical valve, generally designated as 13. Valve 13 has a wall 14 containing a threaded aperture 15 and defines a chamber 16 within which a sealed piston 17, loaded by a spring 18, is located. In the event that pressure existing on the right hand side of piston 17 traverses that piston and enters into chamber 16 said chamber 16 must, in numerous instances, be vented to insure operability of a related mechanism. It is also usually desirable to ascertain that gaseous pressure, liquids, dirt, etc., do not enter chamber 16 during venting. Functionally, it is the combination of venting and excluding environment for which plug 1 is best suited. The installation of Fig. 2 illustrates this combination utility. Threads 4 of shank 3 are screwed into threaded aperture 15. Threads 4 may be slightly larger in diameter than the threads of aperture 15 in order to insure a snug fit. The entire plug is preferably made from a resilient material such that the threads are contractable, and when mated with smaller threads, provide both a sealing and locking function. As the threads are advanced tip 8 makes contact with wall surface 14a. Skirt 7, being formed of a resilient material, begins to bend and flare radially outward. By the time shoulder 9 contacts surface 14a skirt 7 will have flexed sufficiently to provide an effective seal between annular groove 12, now defined between skirt 7, shoulder 9 and surface 14a, and the outer environment. Shoulder 9, in solidly contacting surface 14a, prevents any further movement toward that surface and provides a seal about aperture 15. It also prevents over-flexing of skirt 7.

Figure 3:
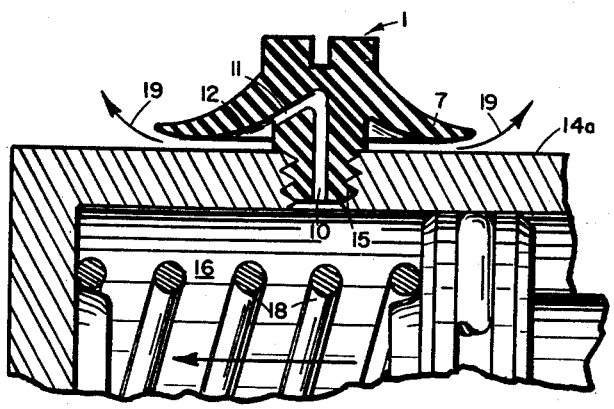
Fig. 3 is a view similar to Fig. 2 illustrating resilient lip action during venting.

Operationally, any fluid in chamber 16, the pressure of which is in excess of a pre-determined pressure, exits from the chamber through passages 10 and 11 and enters annular groove 12. As more particularly shown in Fig. 3 the resultant pressure in annular groove 12 forces resilient lip member 7 to flex and lose contact with surface 14a, allowing the pressurized fluid to exit as indicated by arrows 19. When the pressure has been dissipated the resiliency of lip 7 immediately returns tip 8 to its original sealing position. Thus, tip 8 contacts wall surface 14a directly at all times except during actual venting phases. This seal is normally effective in preventing extraneous material, such as water, ice, dirt, etc., from entering annular groove 12. However, in the event that such unwanted materials do enter annular groove 12, due, for example, to an extremely rough valve surface, the materials are trapped within the groove and prevented by the labyrinth from entering the valve body. When the next pressure surge occurs venting carries away the trapped materials.

The simplicity of this vent plug and its efficiency of operation will be readily appreciated. It may be molded or machined as an integral unit. And, it may be adapted as a standardized part to standardized apertures in a variety of applications. Relief pressure may be controlled within certain design limits by systematic material selection, control of lip member thickness and designation of operational temperature ranges.

Figure 4:
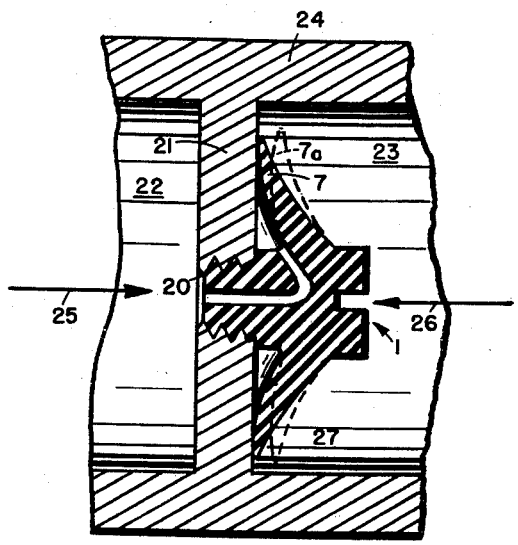
Fig. 4 is a sectional view showing the plug used as a check valve in a fluid passage.

Fig. 4 illustrates the manner in which the plug may be installed for utilization as a check valve. Plug, or valve, 1 is shown installed within an aperture 20 through a wall 21 which separates chambers 22 and 23 within pipe 24. When fluid flow is in the direction indicated by arrow 25 valve 1, installed in the manner illustrated, allows fluid to flow through the labyrinth passage and into annular groove 12. Flexible lip 7 is forced outwardly approximately to the alternate position 7a illustrated by the dotted lines. Fluid thus flows from beneath flexed lip 7 and proceeds through chamber 23 in the initial direction. When the fluid flow direction is reversed, as indicated by arrow 26, the resiliency of lip 7, together with the pressure acting against it, forces the lip into sealing contact with surface 27 of wall 21, effectively preventing fluid flow in the alternate direction.

It is to be understood that other conventional means for attachment may be substituted for the threaded shank of the described plug.

While the described shape of skirt 7 is preferred it is not intended that the invention be limited to this configuration. It is important, however, that a skirt member be present which is capable of normally resiliently sealing against a surface, but which may be flexed under the described pressure conditions, and that the skirt defines, with adjacent portions of the plug and the surface being sealed, a groove or trap capable of trapping extraneous materials.

The material of which vent plug or valve of this invention is made may be any one of a variety of resilient materials, dependent upon the design characteristics desired and the environmental conditions to which it will be subjected. Temperature and pressure are of particular importance. When temperature and pressure are approximately ambient a relatively soft, resilient material, for example, neoprene rubber, may be used; however, when extreme temperatures and/or pressures are involved less resilient and more temperature-insensitive materials, for example, polychlorotrifluorethylene (Kel–F), polytetrafluorethylene (Teflon) or a polyamine such as nylon may be used. The ability of a material to exhibit desirable resiliency characteristics over specific temperature and pressure ranges will determine the usability of that material for specific applications.

Other factors which will influence the degree to which the claimed article will perform the desired functions are the thickness and the length of the flange or lip member and the angles at which it protrudes from the main body. The simplicity of the basic unit which may be adapted to a variety of uses and which is usable with standardized openings is particularly significant.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A vent plug comprising a body portion having a first end and a second end, a resilient skirt member having an interior peripheral surface and circumferentially depending at an acute angle from said first end generally toward said second end and defining, between the interior peripheral surface and a central portion of said body, an annular groove having an acute angle at the bottom thereof, means forming a reentrant passage in said body portion interconnecting the bottom of said annular groove and said second end, and attachment means associated with said body portion at said second end for retaining said body portion in a fixed position.

2. A vent plug as set forth in claim 1 wherein said plug is integrally formed from resilient material, wherein said attachment means comprises threads upon said second end adapted to engage mating threads on an adjacent structure in an interference fit.

3. A uni-directional fluid flow plug comprising a body portion having two ends, a resilient, tapered, conical skirt depending at an acute angle from one end of said body portion and defining an annular groove between the free end of said skirt and said body portion, means in said body portion defining a tortuous aperture including a passageway at an acute angle to the longitudinal axis of said body portion and interconnecting said annular groove with the other end of said body portion, and attachment means upon said other end.

4. A vent plug comprising a body portion having a first end and a second end, a resilient lip member having an interior peripheral surface and depending from said body adjacent said first end at an acute angle to the longitudinal axis of said body portion and extending in the general direction of said second end, said lip member being of thicker cross section at its point of attachment to said body than at its free end and tapered therebetween, said interior peripheral surface of said lip defining with said body an annular reentrant groove therebetween, means in said body portion forming a reentrant aperture extending from said second end to the bottom of said annular groove, and attachment means upon said second end.

5. A plug for uni-directional fluid flow comprising a substantially cylindrical body portion, a resilient skirt member integral with and depending at an acute angle from a first end of said body portion generally toward a second end, said second end of said body portion including means for attachment through an apertured wall, the end of said skirt being adapted to resiliently contact a surface of the wall when said plug is attached therethrough, said body portion and said skirt defining an annular reentrant groove therebetween, means in said body portion defining a reentrant channel comprising a first passage extending partially only and substantially centrally through said body portion from said second end and a second passage slanting from the bottom of said annular groove toward said first end and intersecting said first passage, and a shoulder upon said body portion between said groove and said means for attachment for stopping axial plug movement toward the wall and for sealing thereagainst.

6. An environment excluding vent plug comprising a body member, a first end of said body member being shaped to accommodate a tightening tool, a resilient skirt member having an inner peripheral surface and depending substantially radially and axially at an acute angle from said body member adjacently of said first end generally toward a second end and defining an annular reentrant groove with said body member, means in said body member defining a first axial aperture partially through said body member from said second end to a point closer to said first end than said groove and a second aperture extending tangentially from said inner peripheral surface toward said first end and intersecting said first aperture at the end thereof, an attachment means upon said second end of said body member for attaching said plug to an object to be vented.

7. In combination, an environment excluding vent plug and a chamber wall having means forming an aperture therethrough, said plug comprising a generally cylindrically shaped body having first and second ends, said second end including attachment means for retaining said plug in said aperture, a circumferential shoulder upon said body between said first and said second ends, said shoulder being of greater diameter than said second end and said wall aperture and adapted to contact and seal against a surface of said wall adjacent said aperture, substantially frustro-conical resilient skirt member depending at an acute angle from said body, the free end of said skirt being directed generally toward said second end of said body and extending axially beyond said shoulder, said skirt member defining a reentrant annular groove with said body adjacently of said shoulder and being of decreasingly tapered cross section from its point of attachment to said body to its free end and of sufficient length to resiliently contact said wall surface and form a seal therewith, means in said body forming a first passage extending axially and partially therethrough from said second end and a second passage extending from said groove toward said first end of said body, said passages intersecting and terminating at their point of intersection to form a single reentrant passage communicating between said second end and said annular groove, whereby preessurized fluids are vented from a chamber enclosed by said chamber wall by traversing said reentrant passage entering said annular groove and exiting by causing said skirt to flex, the inherent flexibility of said skirt causing its return to a sealing position after venting.

8. In combination, a vent plug and chamber wall having means forming an aperture therethrough, said plug comprising a body portion having a first end and a second end, a resilient skirt member having an interior peripheral surface and circumferentially depending at an acute angle from said first end generally toward said second end and defining between the interior peripheral surface and a central portion of said body an annular groove having an acute angle at the bottom thereof, said resilient skirt member having a tip portion in normally sealed relationship to a surface of said chamber wall surrounding said aperture, means forming a reentrant passage in said body portion interconnecting the bottom of said annular groove and said second end, and attachment means associated with said body portion at said second end for retaining said body portion in a fixed position.

References Cited in the file of this patent

UNITED STATES PATENTS

| 670,794 | Lott | Mar. 26, 1901 |
| 2,173,571 | Jesnig | Sept. 19, 1939 |
| 2,225,395 | Young | Dec. 17, 1940 |
| 2,825,479 | Litzie | Mar. 4, 1958 |